United States Patent [19]

Iten

[11] 3,803,487

[45] *Apr. 9, 1974

[54] METHOD OF AND APPARATUS FOR MEASURING THE FREQUENCY OF ELECTRICAL SIGNALS

[75] Inventor: Paul Iten, Oberronhrdorf, Switzerland

[73] Assignee: Brown, Boveri & Company Limited, Baden, Switzerland

[ * ] Notice: The portion of the term of this patent subsequent to July 3, 1990, has been disclaimed.

[22] Filed: May 2, 1972

[21] Appl. No.: 249,635

[30] Foreign Application Priority Data
May 10, 1971 Switzerland................. 006881/71

[52] U.S. Cl............................................. 324/78 D
[51] Int. Cl............................................. G01r 23/02
[58] Field of Search............ 324/78 D, 79 D, 77 A; 328/160, 140; 356/28; 343/8

[56] References Cited
UNITED STATES PATENTS
3,532,977  10/1970  Giordano et al................. 324/77 A

*Primary Examiner*—Alfred E. Smith
*Attorney, Agent, or Firm*—Wolfgang G. Fasse

[57] ABSTRACT

A method and apparatus for determining the frequency of an input signal of varying amplitude, in which a time marking signal is derived from the input signal in response to a zero transit of the input signal following a half cycle in which the input signal exceeds a given level. The time marker signal is applied to a counter which provides a measurement indicative of the input signal frequency. The operation of the counter is controlled by a control signal derived from the input signal and having a duration responsive to the total duration of cycles that the input signal has exceeded the level.

9 Claims, 3 Drawing Figures

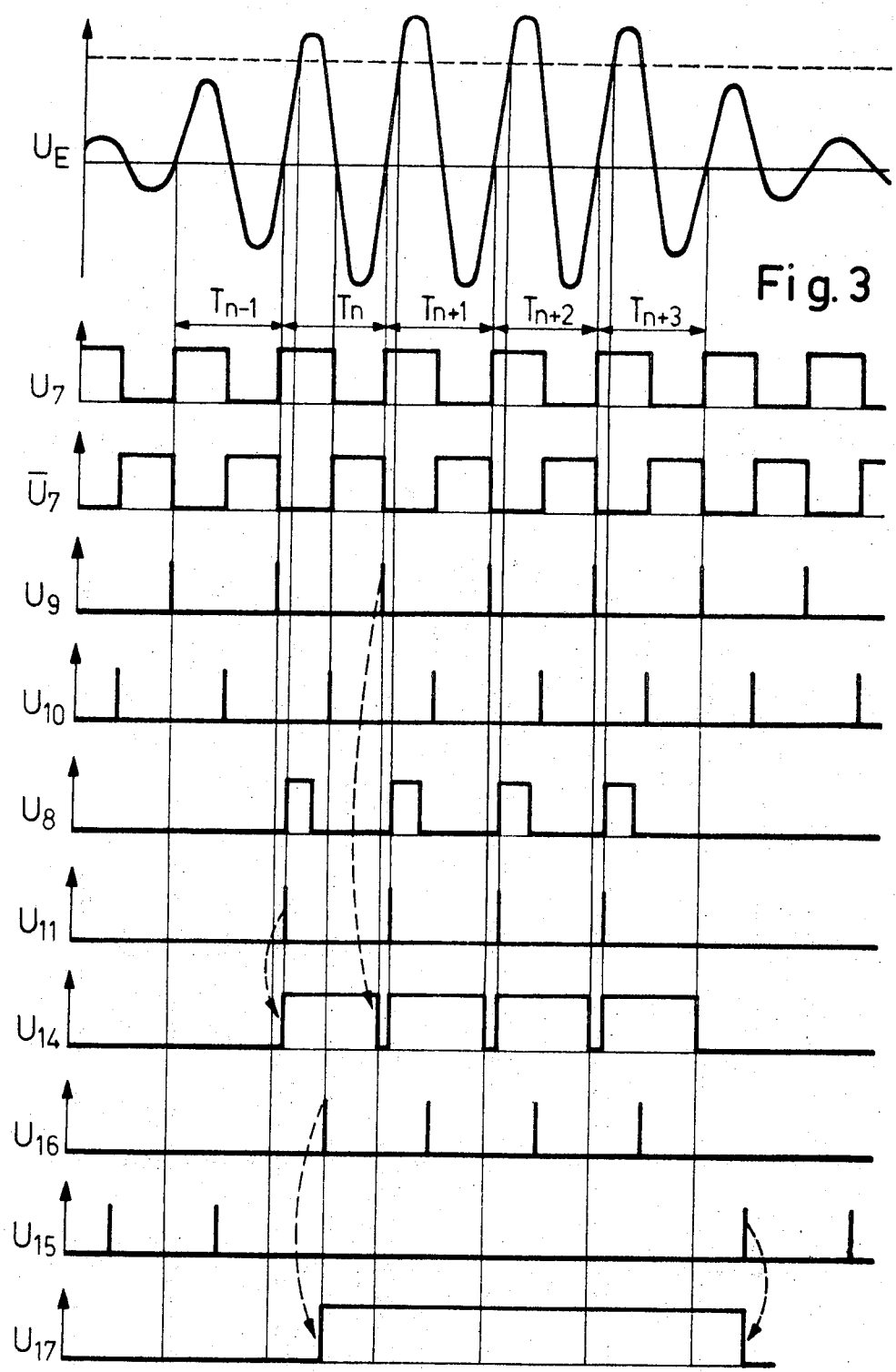

METHOD OF AND APPARATUS FOR MEASURING THE FREQUENCY OF ELECTRICAL SIGNALS

BACKGROUND OF THE INVENTION:

The present invention relates to a metohd of measuring the frequency of electrical signals which exceed a specific, adjustable level, and which in particular have statistically fluctuating amplitudes. The invention relates, furthermore, to an apparatus for implementing this method.

Methods and arrangements of the above kind are employed primarily in situations where the frequencies of electrical signals have to be determined, although the actual effective signal exhibits substantial amplitude fluctuations. These fluctuations may be the consequence of the system itself or may, for example, be produced by disturbances.

In particular, measuring techniques and arrangements of this kind, are required in Doppler radar systems. This will be explained hereinafter making reference to a flow detector of laser type employing the Doppler principle.

In flow detectors of the laser type, the beam from a continuous laser is focussed on to that area of the flow system which contains particles capable of producing scatter. Because of the moving particles of the flow system, the scatter laser light beam experiences a Doppler shift which provides a measure of the velocity of scattering particles and therefore of the flow rate. In order to measure this frequency shift, the unscattered light beam and a selected, scattered light beam are both focussed through optical means, e.g., mirrors, lenses, etc., on a light detector such as a photo-multiplier, so that a heterodyned (difference) signal is produced which has a lower and therefore electronically processable frequency. The frequency of the heterodyned signal will be somewhere in the KHz to MHz range, depending upon the flow rate. Details and examples of flow detectors of laser type operating on the Doppler principle are to be found, for example, in IEEE J. of Quantum Electronics 1966, 260–266.

Frequency analyzers are generally used to process the heterodyne signals. However, these analyzers are unsatisfactory if the heterodyne signals contain major fluctuations and this is generally the case in the above examples of signals to be measured. In addition, measurement can be erroneous due to disturbances superimposed upon the heterodyne signals.

A further fact comes into play that renders conventional frequency analyzers unsuitable for use in certain cases.

It has been found that by the application of amplitude discrimination to the heterodyne signals, a considerable reduction in the measurement volume fundamentally provided by the focussing volume of the incident laser beam can be attained. Thus, due to this amplitude discrimination the case can arise in which the heterodyne signals furnished no longer appear continuously but appear in bunches at the input of the measurement equipment so that they cannot be processed by conventional frequency measuring systems.

In order to overcome these drawbacks, it has been proposed it has been proposed in my copending U.S. Pat. Application Ser. No. 183,100; filed Sept. 23, 1971, now U.S. Pat. No. 3,743,420 that the frequency of the heterodyne signals be measured in a roundabout way through their periodicity. In this context a time marker signal is derived from the input signal. The time marker signal indicating the number of periods of the input signal which have exceeded a specific, adjustable level, viz. the discrimination level. In addition a control signal which incorporates the overall duration of these periods is also derived from the input signal. Both signals are subjected to subsequent analogue processing. A direct voltage proportional to periodicity is obtained from the time marker signal and this direct voltage is subsequently converted to a voltage which is proportional to the heterodyne signal. The control signal is employed to interrupt the processing of the measured value when the input signal, or the quantities derived from it, ceases or cease to satisfy specific conditions.

The measuring of the measured value by the above technique, however, is a very elaborate procedure and only of limited accuracy.

OBJECTS OF THE INVENTION:

The object of the invention is to provide a method of measuring frequencies or frequency-proportional quantities, which does not exhibit the disadvantages of the known or proposed methods or makes such methods possible for the first time. A second object of the invention is to provide an apparatus suitable for implementing the method, the apparatus being characterized by simplicity of construction and high accuracy.

SUMMARY OF THE INVENTION:

The attainment of these objectives is based upon the following considerations:

Conventional frequency measuring arrangements such, for example, as frequency meters, are for obvious reasons unsuitable for the measurement of the frequencies of electrical signals when these latter occur in the form of relatively short pulse trains interrupted by pauses lasting several cycles, since frequency meters of this kind operate with fixed counting times. However, if in accordance with the invention such frequency meters are supplied with a counting time determining signal with takes into account the pauses between the individual pulse trains, then they are able to measure the frequencies of signals of the kind introductorily referred to.

Briefly stated, in accordance with the invention a method of measuring the frequency of electrical signals which exceed a specific, adjustable level, and which in particular exhibit statistically fluctuating signal amplitudes is provided in which in the event of a zero transit in the input signal and in the event that the input signal has exceeded the said level during the half-cycle preceding the zero transit, a time marker signal is derived from the signal which indicates the number of cycles which have exceeded said level. In addition, a control signal is derived from the input signal, the control signal indicating the total duration of the cycles which have exceeded the said level. The time marker signal is applied to a counter whose counting time is controlled in accordance with the said control signal.

In this manner, electrical signals can be processed which consist of pulse trains of extremely short duration containing pauses of arbitrary length. Any disturbances in the effective signal are reliably eliminated, provided that they do not exceed the discrimination level. Parasitic frequencies occurring outside the selected range and having signal amplitudes greater than the said level, can be blocked by means of suitable filter circuits at the input of the device.

It is furthermore possible to directly take account of the system constant of the measuring arrangement by a suitable choice of the quantities which determine the counting time. For example, in the case of flow detectors of laser type based upon the Doppler principle, the conversion factor between Doppler frequency and flow rate can be taken into account.

A device in accordance with the invention for the implementation of the above method is comprised of a scanning device for producing the time marker and control signals from the input signal; a counter to which the time marker signal is supplied; and means for controlling the counting time of the said counter as a function of the control signal.

The device for implementing the method of the invention is distinguished by simplicity of design. It can readily be produced with normal commercially available modules of the kind used in digital techniques.

BRIEF DESCRIPTION OF THE DRAWINGS:

In order that the invention may be clearly understood, it will now be described, by way of example, with reference to the accompanying drawings, wherein:

FIG. 3 is a pulse time diagram designed to explain the mode of operation of the scanning circuit shown in FIG. 2.

Figure 1:
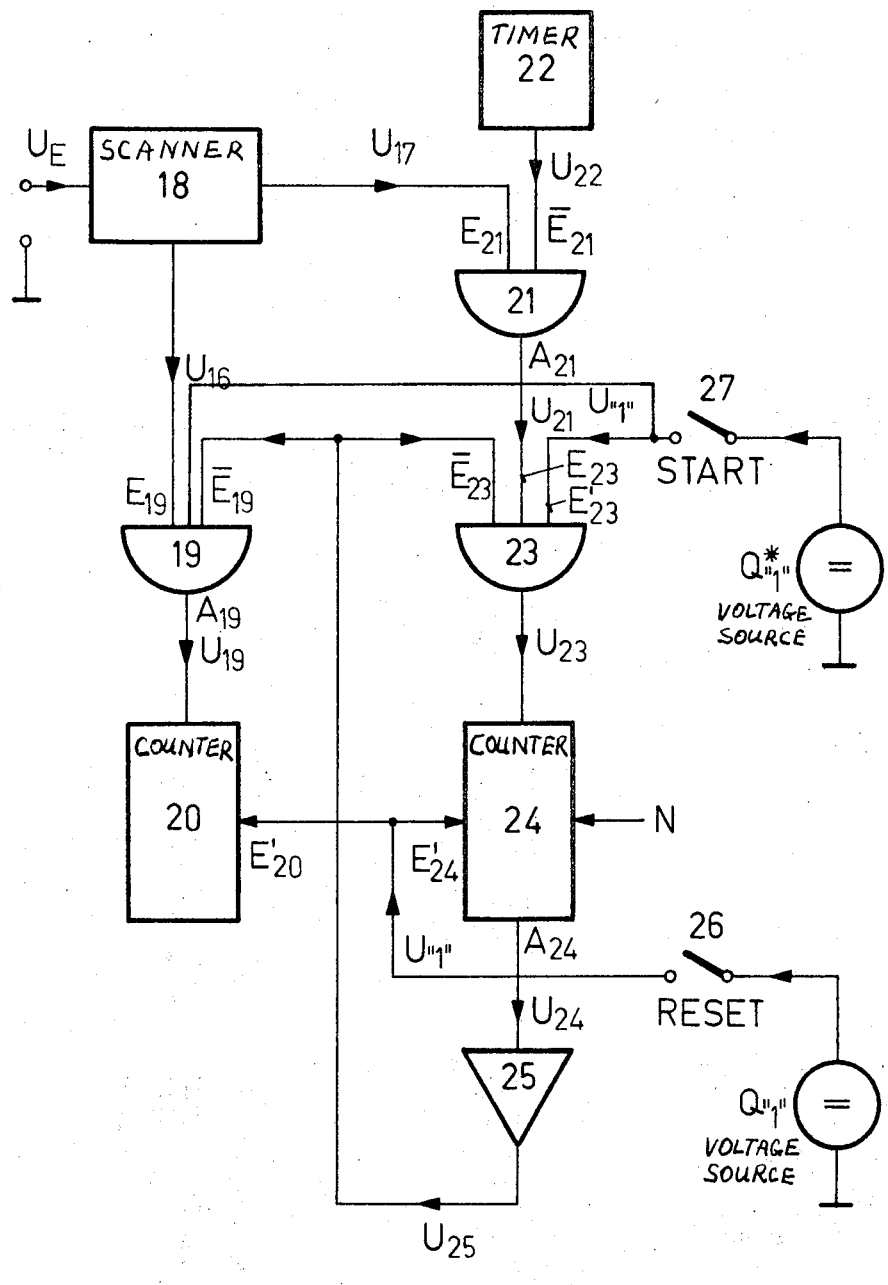
FIG. 1 is a block circuit diagram of a frequency measuring apparatus in accordance with the invention.

DETAILED DESCRIPTION OF EXAMPLE EMBODIMENTS:

FIG. 1 is a block circuit diagram of an example of a frequency measuring apparatus for determining the frequency of an input signal $U_E$. The input signal $U_E$ is applied to the input of a scanning circuit 18. The device 18 derives a time marker signal $U_{16}$ and a control signal $U_{17}$ from the input signal. An exhaustive description of this circuit as well as its mode of operation, will be provided hereinafter. Briefly stated, however, the time marker signal $U_{16}$ is comprised of a pulse train of pulses at the frequency of $U_E$ and occurring when $U_E$ exceeds a given threshold level, and the control signal $U_{17}$ is a gate signal which occurs continuously during any uninterrupted sequence of the pulses of $U_{16}$. The time marker signal is applied to the first input $E_{19}$ of a gate circuit 19 which may, for example, be an AND-gate. The output $A_{19}$ of this gate circuit is connected to the input of a counter 20. The control signal $U_{17}$ is supplied to the first input $E_{21}$ of a further gate circuit 21, for example an AND-gate. The second input $\bar{E}_{21}$ of this AND-gate is connected to the output of a timing pulse generator 22. The first input $E_{23}$ of a gate circuit 23 is connected to the output of the gate circuit 21 and the output of gate circuit 23 is applied to the input of a preset counter 24. The so called overflow output $A_{24}$ of this preset counter is applied by way of an inverter element 25 both to the second input $\bar{E}_{19}$ of the gate circuit 19 and to the second input $\bar{E}_{23}$ of the gate circuit 23. The counter 20 and preset counter 24 can be reset by means of a switch 26. For this purpose a voltage $U_{"1"}$ corresponding to the logic "1" of the system and produced by a source $Q_{"1"}$ can be applied to corresponding inputs $E'_{20}$ and $E'_{24}$ of the two counters 20 and 24. To start the counters 20 and 24, the voltage $U_{"1"}$, produced by a source $Q^*_{"1"}$, and corresponding to the logic "1" of the system, is applied by a switch 27 to the third input $E'_{19}$ of the gate or gating circuit 19 and to the third input $E'_{23}$ of the gate or gating circuit 23.

The mode of operation of the apparatus shown in FIG. 1 will be explained hereinafter. To simplify the description, it will be assumed that all the gate or gating circuits 19, 21 and 23 are AND-gates. Furthermore, the voltages (pulses) occurring in the apparatus of FIG. 1 are identified in the following manner: The output voltage "U" of the module "$i$" is identified as "$U_i$".

Assume initially that the start switch 27 is open and that the counters 20 and 24 are reset to zero. By means of a device which has not been shown (e.g., a conventional presetting circuit for a counter), the preset counter 24 is set to a fixed number N, this being indicated by the arrow marked N. After the switch 27 has closed, assuming that time marker and control signals are available, the AND-conditions at the AND-gates 19 and 23 are satisfied. The counter 20 counts the pulses of the time marker signal $U_{16}$ which come from the scanning device 18. The time marker pulses $U_{22}$ are applied to the preset counter 24 in dependence upon the control signal $U_{17}$, and counted therein. When the number of timing pulses reaches the preset value N, a signal $U_{24}$ appears at the overflow output $A_{24}$ of the preset counter. This signal is inverted in an inverter element 25 and inhibits the transfer of time marker pulses through the AND-gate 19 and of timing pulses through the AND-gate 23. Consequently, the counting operation in the counters 20 and 24 is interrupted. It is apparent that the inverter element 25 can be omitted if the preset counter 24 produces an output signal corresponding to the logic "O" of the system as soon as the number of input pulses correspond with the preset number N.

Assuming that the pulse length of the timing pulses is short compared with the pulse length of the control signal, the number of timing pulses supplied to the preset counter 24 is given by $$N = f_{Takt} \ \Sigma T_{17},$$

1.

where N is the number set on the preset counter, $f_{Takt}$ the repetition frequency of the timing pulses produced by generator 22 and $\Sigma T_{17}$ the sum of the pulse lengths of the control signal during the time of observation.

The count C reached by the counter 20 at the time of halting of the AND-gate 19 is given by $$C = f_E \ \Sigma T_{17},$$

2.

where $f_E$ is the repetition frequency of the time marker pulses during the pulse duration of the control signal, and thus indicates the true frequency of the input signal.

From the relationships (1) and (2), we then obtain $$f_E = C \ f_{Takt}/N$$

3.

The count C of the counter 20 is accordingly directly proportional to the true frequency of the input signal, with a proportionality factor determined by the pulse frequency and the number N set on the preset counter 24. This factor can be quite arbitrarily chosen within certain limits and is left virtually unrestricted by the following conditions governing the values $f_{Takt}$ and N, because in accordance with (3) it is purely the ratio between the two which is of any significance.

The duration of the timing pulses must be short as compared with the pulse duration of the control signal.

Since the pulse duration of the control signal is at least equal to the pulse length of the input signal, the pulse length of the timing pulses must be short in comparison to that of the input signal.

If the measurement error is to be less than 1 percent then $f_{Takt}$ must be much greater than (i.e., at least 100 times as great as) the frequency of the input signal $U_E$. A second condition is that N must be sufficiently large as compared with the pulse frequency $F_{Takt}$. A further condition is that the observation time must be sufficiently long. In other words, if the measuring operation whose duration is determined by N and $f_{Takt}$ as well as by the pauses in the sequence of the control signal, is prematurely interrupted, i.e., the number of timing pulses at the preset counter reaches the preset figure N, then results are obtained which simulate higher frequency input signals. The true measurement time (corresponding to the above defined sum $\Sigma T_{17}$) should for this reason correspond to at least 100 cycles of the input signal if the accuracy is to be better than 1 percent.

It is obvious that the last mentioned error and the error which results from the ratio between pulse frequency and input signal frequency, affect one another as far as error calculation is concerned.

By a suitable choice of $f_{Takt}$ and/or N, it is possible in this fashion, considering flow detectors operating on the Doppler principle, to readily introduce the system constant of the measuring arrangement, that is to say the proportionality factor between the flow rate which is to be determined and the frequency of the Doppler signals (heterodyne signals). In this way, the device can be so adjusted that the flow rate can be calibrated directly on the counter 20 in suitable units.

In choosing pulse frequency $f_{Takt}$ and N, it is advisable for N to be settable in decades and for the intermediate values to be obtained by the use of a suitable $f_{Takt}$. The advantage of this procedure resides in the fact that the preset counters with decade preselection are relatively cheap and timing pulse generators can normally be adjusted to any desired frequency, because of the very principle upon which they are based.

The system constant of conventional flow detectors of the laser type which employ the Doppler principle will lie, for example, between 0.2 ms$^{-1}$/MHz and 10ms$^{-1}$/MHz, so that virtually all flow rates which occur in practice can be dealt with in the manner proposed in accordance with the invention.

Figure 2:
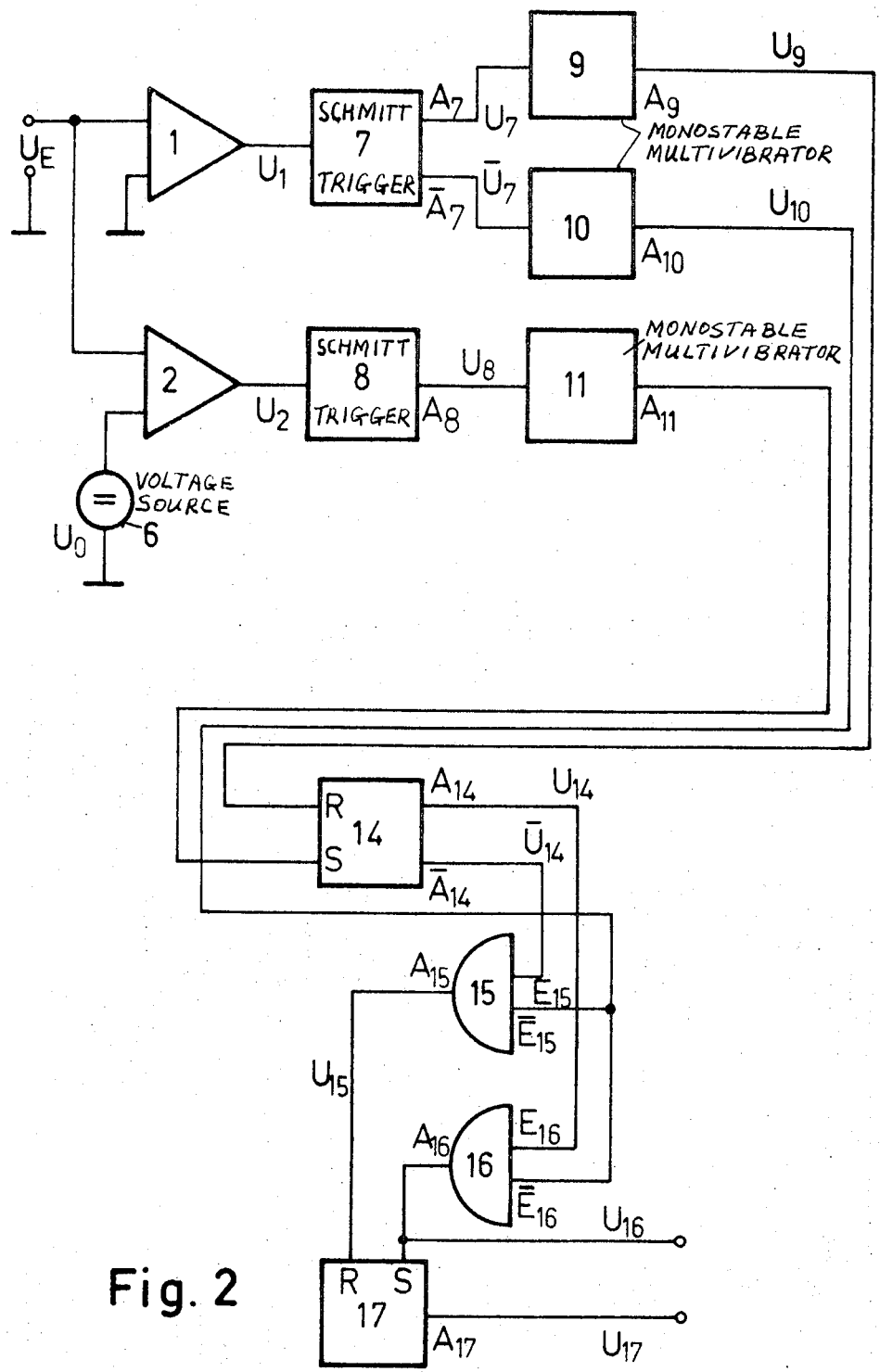
FIG. 2 is a block circuit diagram of a scanning circuit for producing time marker and control signals from the input signal.

In FIG. 2, an example of a scanning circuit has been illustrated by way of example. Known modules used in digital techniques, as for example comparators, Schmitt triggers, monostable multivibrators, etc. have not been indicated in any detail because they constitute part of the prior art.

The input signal $U_E$ is applied to the inputs of the two comparators 1 and 2. The reference input of the comparator 1 is grounded. The reference input of the comparator 2 is connected to a preferably variable voltage source 6 whose other side is grounded. The output of the comparator 1 is connected to the input of a first Schmitt trigger 7 and the output of the comparator 2 is connected to the input of a second Schmitt trigger 8. The first Schmitt trigger has two outputs $A_7$ and $\bar{A}_7$. A first monostable multivibrator 9 is connected to the output $A_7$ of the Schmitt trigger 7, and a second monostable multivibrator 10 is connected to the output $\bar{A}_7$. A third monostable multivibrator 11 is connected to the output $A_8$ of the Schmitt trigger 8. The output $A_{11}$ of the latter is connected to the S input of an RS flip-flop 14 and the output $A_9$ of the first monostable multivibrator 9 to the R input of the flip-flop 14.

The output $A_{14}$ of the flip-flop 14 is connected to the first input $E_{15}$ of a first AND-gate 15. The output $\bar{A}_{14}$ of the flip-flop 14 is connected to the first input $E_{16}$ of a second AND-gate 16. The second inputs $\bar{E}_{15}$ and $\bar{E}_{16}$ of the AND-gates 15 and 16 are connected in parallel to the output $A_{10}$ of the second monostable multivibrator 10. The R input of a second RS flip-flop 17 is connected to the output $A_{15}$ of the first AND-gate 15 while the output $A_{16}$ of the second AND-gate 16 is taken to the S input of the RS flip-flop 17.

The mode of operation of the above described circuit arrangement in accordance with FIG. 2, will be explained hereinafter with reference to the pulse time diagram shown in FIG. 3. In order to simplify the description, the output voltages of the individual modules have been designated as follows:

The output voltage from the $i^{th}$ module is denoted "$U_i$", and the negation of $U_i$ is denoted "$\bar{U}_i$".

The explanation of the signal processing commences with the start of cycle $T_n$ of the input signal $U_E$. The two RS flip-flops 14 and 17 are initially in their inoperative states. The voltages $U_7$, $\bar{U}_7$, $U_9$ and $U_{10}$ are present as indicated in FIG. 3 irrespective of whether the input signal is greater or less than the selected discrimination level $U_o$ (of course, if there is no input signal, this remark does not apply). As soon as the input signal $U_E$ exceeds the level $U_o$, the first $U_{11}$ pulse is generated. This sets the RS flip-flop 14 as indicated by the arrow in FIG. 3. With the next negative zero transit in the input signal $U_E$, the pule $U_{10}$ is produced and this is applied to the second input $\bar{E}_{16}$ of the second AND-gate 16. This satisfies the AND-condition at this AND-gate and the $U_{10}$ pulse is passed as the "first" $U_{16}$ pulse. This $U_{16}$ pulse at the same time sets the RS flip-flop 17.

During the next cycle $T_{n+1}$ (next positive zero transit in the input signal), the $U_9$ pulse resets the RS flip-flop 14. In this fashion, once again the same starting conditions are created for the next cycle $T_{n+1}$. During the ensuing cycles, in which the input signal $U_E$ exceeds a level $U_o$, the above described process is repeated.

The "last" $U_{11}$ pulse (as will be appreciated, this is only produced when the input signal exceeds the level $U_o$), sets the RS flip-flop 14 and at the output $A_{16}$ of the second AND-gate the "last" $U_{16}$ pulse appears. The RS flip-flop is reset by the $U_9$ pulse. Since no further $U_{11}$ pulse follows, the AND-condition is satisfied at the AND-gate 15 for the next $U_{10}$ pulse. This means that the $U_{10}$ pulse is passed and appears at the output $A_{15}$ of the AND-gate 15 as a $U_{15}$ pulse, resetting the RS flip-flop 17.

The output pulses $U_{16}$ and $U_{17}$ carry the desired information as follows:

The number of $U_{16}$ pulses indicates the number of cycles of the input signal $U_E$ that have exceeded the discrimination level $U_o$, and the length of the $U_{17}$ pulse corresponds to the total duration of this number of cycles of the input signal. The duration of the individual cycles is determined by means of the position of the $U_{16}$ pulses and also by means of the decaying flank of the $U_{17}$ pulse.

As mentioned above, the measuring devices according to the invention are particularly suitable for use in Doppler radar systems. The Doppler signal, if we commence from a constant flow rate, is an a.c. voltage whose amplitude fluctuates statistically.

In the focussing volume, the intensity of the light drops off steeply from the center towards the outside. Consequently, the Doppler signals scattered by the particles flowing through the focussing volume have greater or lesser amplitudes depending upon whether the scattering particle is nearer the center or the boundary of the measurement volume. A further cause of this statistical fluctuation in the signal amplitudes resides in the fact that the scattering particles themselves pass through the measurement volume in a random succession.

The first mentioned effect is exploited in order to electronically reduce the movement volume which is fundamentally determined by the focussing volume of the laser light, only Doppler signals being analyzed (that is to say having their frequencies measured) whose amplitudes exceed a specific level. The circuit described above is excellently suited to the attainment of this objective.

Although the invention has been described with reference to specific example embodiments, it is to be understood that it is intended to cover all modifications and equivalents within the scope of the appended claims.

What is claimed is:

1. A method for measuring the frequency of an input signal which has statistically varying amplitudes which may exceed a predetermined level, said method comprising deriving a time marker signal from said input signal in response to the passage of said input signal through a zero transit when the input signal amplitude has exceeded said level during its half cycle preceding the zero transit, whereby said time marker signal indicates the number of cycles of said input signal that have exceeded said level, deriving a control signal from said input signal responsive to the total duration of cycles of said input signal which have exceeded said level, applying said time marker signal to a counter, and controlling the counting time of said counter as a function of said control signal.

2. The method of claim 1, wherein said step of controlling the counting time of said counter comprises providing timing pulses, applying said timing pulses which coincide with said control signal to a preset counter, and applying the overflow of said preset counter to said first mentioned counter after said preset counter has counted a predetermined number of timing pulses to interrupt the count of said first mentioned counter.

3. An apparatus for measuring the frequency of an input signal which has statistically varying amplitudes which may exceed a predetermined level, said apparatus comprising a scanning circuit, means applying said input signal to said scanning circuit, said scanning circuit comprising means for producing a time marker signal in response to the passage of said input signal through a zero transit when the input signal level has exceeded said level during its preceding half cycle, and means for producing a control signal from said input signal and responsive to the total duration of cycles of said input signal which have exceeded said level, said apparatus further comprising a counter, means applying said time marker signal to said counter, and means controlling said counter as a function of said control signal, whereby the count of said counter provides a measure of said frequency.

4. The apparatus of claim 3, wherein said scanning circuit is comprised of first and second comparator means connected to compare said input level with ground reference and a predetermined reference voltage respectively, first and second trigger circuits connected to the outputs of said first and second comparators respectively, first and second monostable multivibrators connected to the output and negated output respectively of said first trigger circuit, a third monostable multivibrator connected to the output of said second trigger circuit, first and second RS flip-flops, first and second AND-gates, means connecting the outputs of said first and third multivibrators to the R and S inputs of said first flip-flop respectively, means applying the output and negated output of said first flip-flop to said first and second AND-gates respectively, means applying the output of said second multivibrator to said first and second AND-gates whereby the output of said first AND-gate comprises said time marker signal, and means applying the outputs of said second and first AND-gates to the R and S inputs respectively of said second flip-flop whereby the output of said second flip-flop comprises said control signal.

5. The apparatus of claim 4, wherein said trigger circuits are Schmitt trigger circuits.

6. The apparatus of claim 3, wherein said means applying said time marker signal to said counter comprises a first AND-gate, and said means for controlling said counter comprises a source of timing pulses, a second AND-gate, means applying said timing pulses and control signal to said second AND-gate, a third AND-gate having one input connected to the output of said second AND-gate, a presettable counter having an input connected to the output of said third AND-gate and means applying a negated output of said presettable counter to said first and third AND-gates when said presettable counter has counted a predetermined number of said timing pulses, said time marker signal also being applied to said first AND-gate and means applying the output of said first AND-gate to said first mentioned counter.

7. The apparatus of claim 6, further comprising a source of a starting potential, and switch means applying said starting potential to said first and third AND-gates.

8. The apparatus of claim 6, further comprising a source of a resetting potential, and switch means applying said resetting potential to reset said first mentioned and presettable counters.

9. The apparatus of claim 3, wherein the frequency of said timing pulses is much greater than the frequency of said input signal.

* * * * *